March 12, 1940.     H. THOMA     2,193,118
HYDRAULIC DEVICE
Filed April 17, 1939
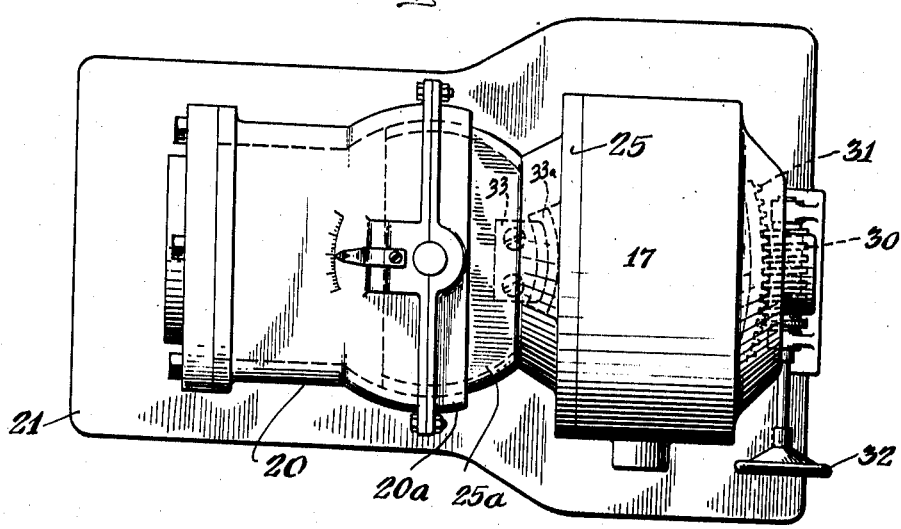
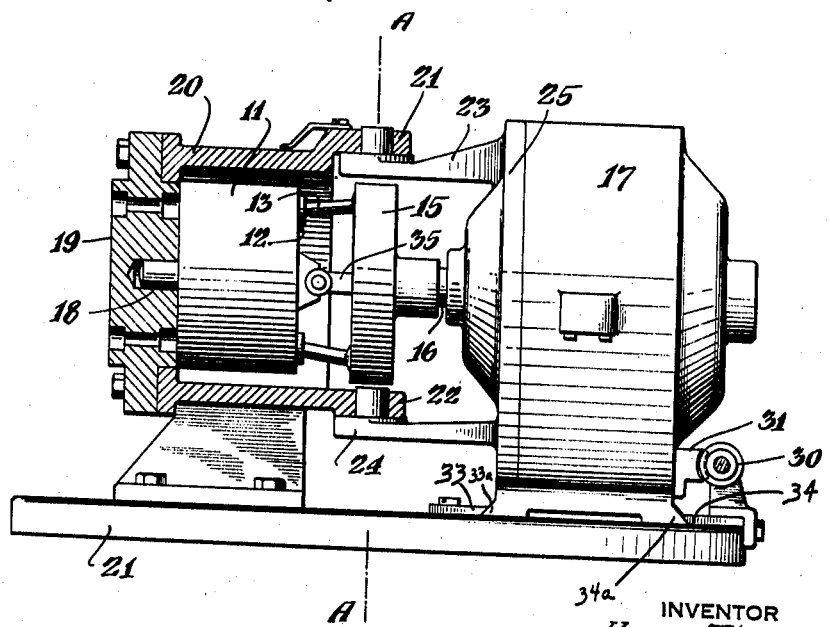
INVENTOR
Hans Thoma
BY
ATTORNEYS Patented Mar. 12, 1940

2,193,118

UNITED STATES PATENT OFFICE 2,193,118

HYDRAULIC DEVICE

Hans Thoma, Karlsruhe, Baden, Germany

Application April 17, 1939, Serial No. 268,290
In Germany February 12, 1938

5 Claims. (Cl. 103—162)

This invention relates to hydraulic devices and has for an object to provide an improved variable volume pump or hydraulic motor referred to herein as a hydraulic displacement device.

It is an object of the invention to provide such a device in which an oscillatable driving member such as a driving flange is connected directly with a driving device such as an electromotor or the like which is mounted for oscillation with the driving flange about an axis for varying the displacement volume of said device.

Another object is to avoid the use of any type of articulation between the power source and the driving flange, as by mounting the power source for oscillatory movement with said driving flange.

Other objects will appear from the following description of an illustrative embodiment of the invention taken together with the attached drawing wherein:

Fig. 1 is a sectional view of a device illustrating the invention; and

Fig. 2 is a plan view thereof.

In said drawing the numeral 11 indicates a cylinder block of usual construction provided with cylinder bores in which operate pistons 12 operated by connecting rods 13, one end of each of which is connected with a driving flange 15 which is shown as mounted directly upon the shaft 16 of an electromotor 17. The cylinder block is mounted for rotation as upon shaft 18 carried by the valve plate 19 associated with the housing 20. The housing 20 is provided with journal openings 21 and 22 within which are journaled arms 23 and 24, respectively. Said arms are firmly attached to the electromotor as by forming extensions of the end plate 25 thereof. The upper journal shows a form in which the housing 20 extends outwardly of the arm 23 whereas the lower journal shows the housing 20 inwardly of arm 24. Either form may, of course, also be used in both locations. The housing 20 is mounted upon a base plate 21 which may also extend under the electromotor and may support it. It will be seen therefore that the electromotor together with the driving flange 15 are mounted for oscillation about the axis A—A. This may be effected by any suitable mechanism such as the worm 30 meshing with a worm segment 31 carried on the motor frame. It will be seen that by turning the hand wheel 32, the motor 17 and the drive flange 15 will be adjusted about the axis A—A, and that thereby the volume of the pump will be varied from zero to a maximum in either direction. This construction has the advantage that it is not necessary to transmit the driving torque through a universal joint.

While the motor is movable this is not objectionable because the supply of power thereto is not interfered with by the motion of the motor since said supply of power may take place through flexible cables or by means of brushes on the motor bearing upon contact segments on the base plate or vice versa.

Another advantage is that it is not necessary to provide jointed conduits for the working fluid since the valve plate 19 is stationary. Furthermore, the valve plate 19 may, in known manner, serve also as the valve plate for a second unit, such as a hydraulic motor. If the hydraulic motor is of constant displacement, it may be attached directly to the valve plate 19 or carried by the base plate 21. If, however, the hydraulic motor is also to be of the variable volume type, its power delivery shaft and driving flange may be mounted upon a stationary base plate to which the base plate 21 is pivoted for oscillation about a vertical axis lying between the driving flange and the cylinder block of the hydraulic motor. In that case a construction would be provided in which base plate 21 and its attached parts would be oscillatable about the base plate of the hydraulic motor for varying the volume of the hydraulic motor and the electromotor 17 would, in turn, as shown, be oscillatable relative to the base plate 21.

It may be desirable to provide a universal joint drive connection between the driving flange 15 and the cylinder block 11, as shown at 35. This may, however, in some cases be eliminated as by having the piston rods 13 bear within the pistons 12 and thus serve to keep cylinder block 11 rotating in synchronism with the driving flange 15.

As shown in Fig. 2, the housing 20 may have a cylindrical or spherical extension 20a enfolding a corresponding extension 25a carried by the end plate 25 of the electromotor whereby the working parts are enclosed and protected from dust and dirt, whereas the oil is retained therein to assure proper lubrication of the working parts.

Although the device shown in the drawing is referred to as a pump, it is, of course, understood that it may also be a hydraulic motor, in which case the device 17 instead of supplying power may be a device for absorbing power such as an electric generator. If the device is used as a pump, the device 17 may be an electric motor, a selfcontained internal combustion engine, a steam engine with flexible or suitably articulated steam supply conduit, or other power supply device, and if used as a hydraulic motor the device 17 may be an electric generator or dynamo, compressor, or any other machine absorbing power delivered to it in rotary form. This class of device is referred to in the claims as a "rotary power device."

Having described an illustrative embodiment of the invention it is pointed out that various changes and modifications therein may be made without departing from the invention as set forth in the following claims.

I claim:

1. In a hydraulic device a housing, a cylinder block journaled for rotation within said housing, cylinder bores in said cylinder block, pistons in said bores, piston rods each connected with one of said pistons and having their other ends connected to a driving flange, a rotary power device connected with said driving flange, and means whereby said rotary power device and driving flange are mounted for oscillation together about an axis at an angle to the axis of rotation of said cylinder block.

2. The combination set forth in claim 1, together with an oil tight joint between said housing and said rotary power device.

3. The combination set forth in claim 1, together with an oil tight joint between said housing and said rotary power device comprising cooperating surfaces on said housing and on said rotary power device curved about a point lying in the axis of oscillation of said driving flange and rotary power device.

4. In a hydraulic device, a base plate, a housing supported thereon, a cylinder block journaled for rotation within said housing, cylinder bores in said cylinder block, pistons in said bores, piston rods each connected with one of said pistons and having their other ends connected to a driving flange, a rotary power device connected with said driving flange, means whereby said rotary power device and driving flange are mounted for oscillation together about an axis substantially perpendicular to the axis of oscillation of said cylinder block, and adjusting means acting between said base plate and said rotary power device for effecting oscillation of said driving flange and rotary power device relative to said housing.

5. The combination of claim 4 wherein said adjusting means comprises a worm carried by said base plate and cooperating with a worm gear segment carried by said rotary power device.

HANS THOMA.